United States Patent [19]
Aoyama

[11] Patent Number: 5,481,825
[45] Date of Patent: Jan. 9, 1996

[54] TRAY FOR CARRRYING PLANT POTS

[75] Inventor: Matsuo Aoyama, Aichi, Japan

[73] Assignee: Kaneya Sangyo Kabushiki Kaisha, Aichi, Japan

[21] Appl. No.: 326,685

[22] Filed: Oct. 20, 1994

[30]     Foreign Application Priority Data

Oct. 22, 1993  [JP]  Japan ..................... 5-264998

[51] Int. Cl.⁶ ..................................... A01G 9/00
[52] U.S. Cl. ........................ 47/18; 47/39; 47/87
[58] Field of Search ............. 47/18 R, 39, 39 P, 47/87

[56]            References Cited

U.S. PATENT DOCUMENTS

| 1,104,719 | 7/1914 | Tucker ........................... 47/87 |
| 3,542,210 | 11/1970 | Sorensen ....................... 47/18 |
| 4,803,806 | 2/1989 | Ito .................................. 47/87 |
| 5,050,339 | 9/1991 | Howell ......................... 47/39 P |

FOREIGN PATENT DOCUMENTS

| 1414605 | 9/1965 | France ......................... 47/18 |
| 4020919A1 | 6/1990 | Germany . |
| 9312895.9 | 7/1994 | Germany . |
| 5344826 | 12/1993 | Japan .......................... 47/18 |
| 7713224 | 6/1979 | Netherlands ................. 47/39 |
| 8702257 | 9/1987 | Netherlands . |

*Primary Examiner*—Terry Lee Melius
*Assistant Examiner*—Joanne C. Downs
*Attorney, Agent, or Firm*—Palmatier, Sjoquist & Helget

[57]            ABSTRACT

A tray for carrying a plurality of plant pots includes a base plate and a plurality of container sections. The container sections are provided in the base plate for receiving pots therein. Each of the container sections has an open top end, a peripheral wall and a bottom wall. Retainer members are disposed on the peripheral wall of each of the container sections and are operable to resiliently apply pressing forces to the side wall of a pot received within the container section so as to fixedly hold the pot in position.

3 Claims, 2 Drawing Sheets

TRAY FOR CARRRYING PLANT POTS

BACKGROUND OF THE INVENTION

1. Field of the Invention

The present invention relates to a tray for carrying a plurality of plant pots.

2. Description of the Prior Art

A conventional tray for carrying a plurality of plant pots includes a base plate and a plurality of container sections formed therein. Each of the container sections includes an opening formed in the base plate and having a suitable configuration, a plurality of support members extending downwardly from the peripheral portion of the opening, and a bottom plate connected to the lower ends of the support members. Plant pots are inserted into the container sections through the openings, so that the pots can be transported at one time.

However, with the conventional tray, the container sections can receive only one kind of pots having a size or configuration conforming to the container sections. Thus, pots having a larger size than the container sections cannot be sufficiently received by the container sections, while pots having a smaller size than the container sections tend to move within the container sections during transportation. In any cases, an operation for transporting pots cannot be satisfactorily performed. Therefore, it is necessary to prepare a number of kinds of trays having container sections of different sizes and configurations so as to cope with various kinds of pots. Such preparation of a number of kinds of trays is unpractical.

SUMMARY OF THE INVENTION

It is, accordingly, an object of the present invention to provide a tray which is adapted for carrying a plurality of plant pots and which includes container sections effective to conveniently receive various kinds of pots having different sizes or configurations.

According to the present invention, there is provided a tray for carrying a plurality of plant pots, comprising:

a base plate;

a plurality of container sections provided in the base plate for receiving pots therein, each of the container sections having an open top end, a peripheral wall and a bottom wall; and retainer members disposed on the peripheral wall of each of the container sections and operable to resiliently apply pressing forces to the side wall of a pot received within the container section so as to fixedly hold the pot in position.

The invention will become more apparent from the appended claims and the description as it proceeds in connection with the drawings,

DETAILED DESCRIPTION OF THE PREFERRED EMBODIMENT

An embodiment of the present invention will now be explained with reference to the accompanying drawings.

Figure 1:
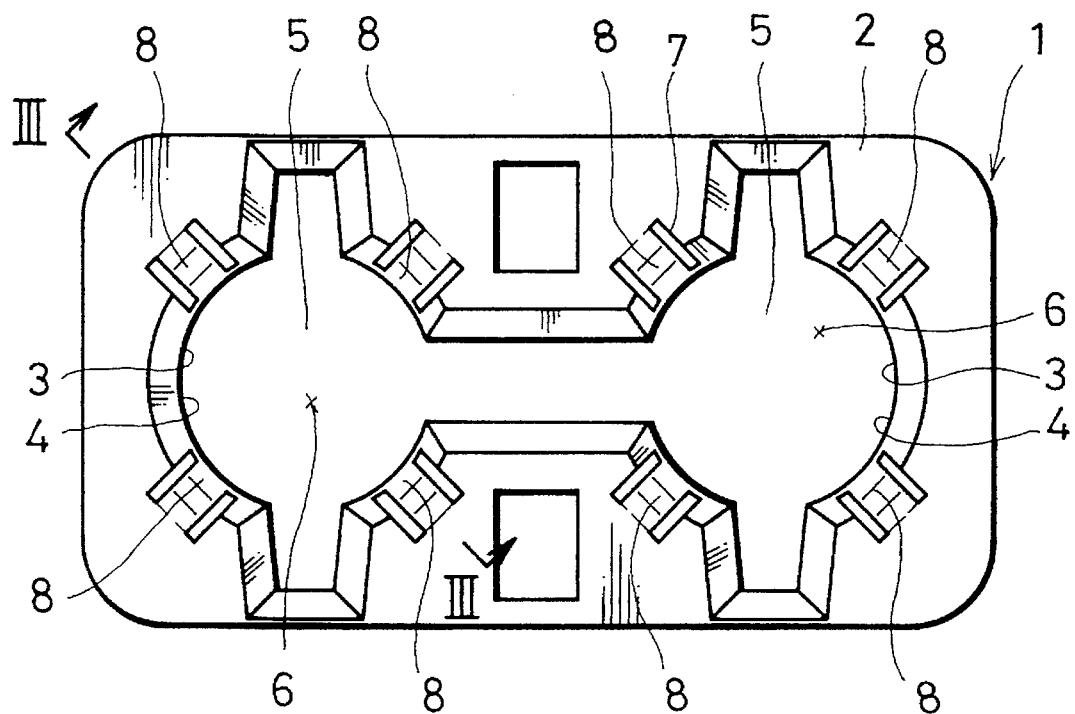
FIG. 1 is a plan view of a tray for carrying a plurality of plant pots according to an embodiment of the present invention.
Figure 2:
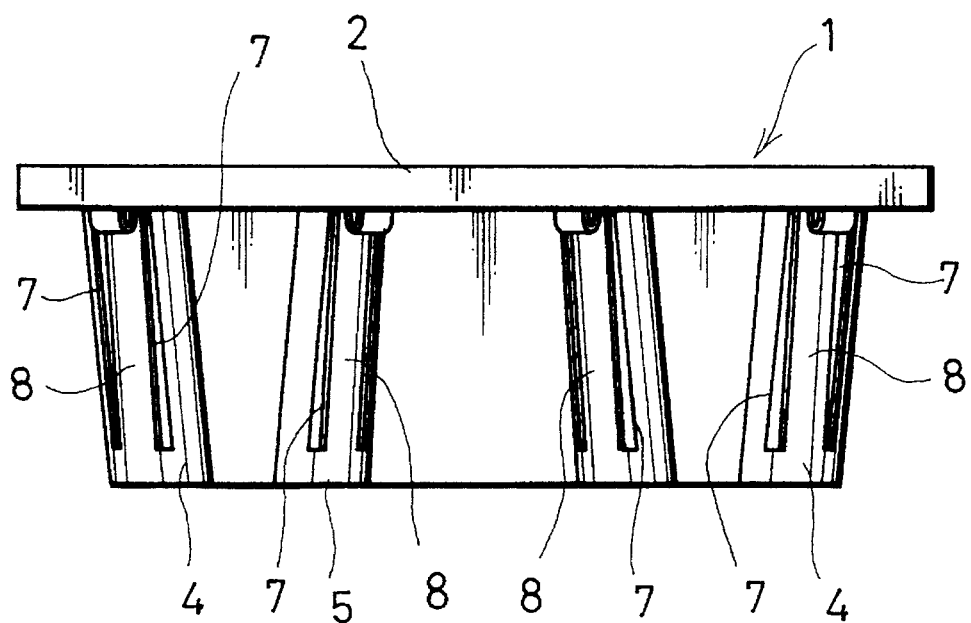
FIG. 2 is a side view of FIG. 1.

Referring to FIGS. 1 and 2, there is shown a tray 1 for carrying a plurality of plant pots (not shown). The tray 1 is made of synthetic resin such as polypropylene and has a flat base plate 2. A plurality of openings 3 are formed in the base plate 2. Each of the openings 3 has a circular configuration in plan view and defines an upper opening of a container section 6 which serves to receive a pot. The openings 3 are the same in size, and their associated container sections 6 are the same in construction. Therefore, the explanation of the construction of the container sections 6 will be made to only one of the container sections 6.

The container section 6 has a tubular peripheral wall 4 which has an upper end connected to the peripheral edge of the corresponding opening 3 and which extends downwardly from the peripheral edge. The peripheral wall 4 has a configuration tapering in a downward direction. A circular bottom wall 5 is connected to the lower end of the peripheral wall 4. Thus, the container section 6 provides a substantially inverted truncated conical space therein.

A plurality of retainer members 8 are formed integrally with the peripheral wall 4 and are equally spaced from each other in the circumferential direction of the peripheral wall 4. Each of the retainer members 8 is separated laterally from the peripheral wall 4 by a pair of slits 7 formed on both sides of the retainer member 8 as shown in FIG. 3, so that each of the retainer members 8 has an upper portion connected to the base plate 2 at a position adjacent the peripheral edge of the opening 3 and that it has a lower portion connected to the peripheral wall 4 at a position adjacent the bottom plate 5.

Figure 3:
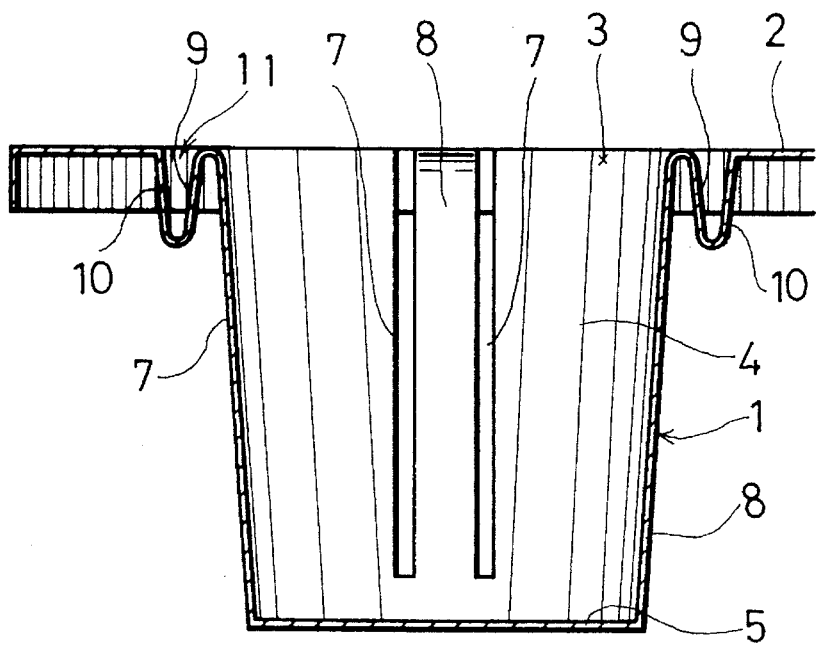
FIG. 3 is a sectional view taken along line III—III in FIG. 1.
Figure 4:
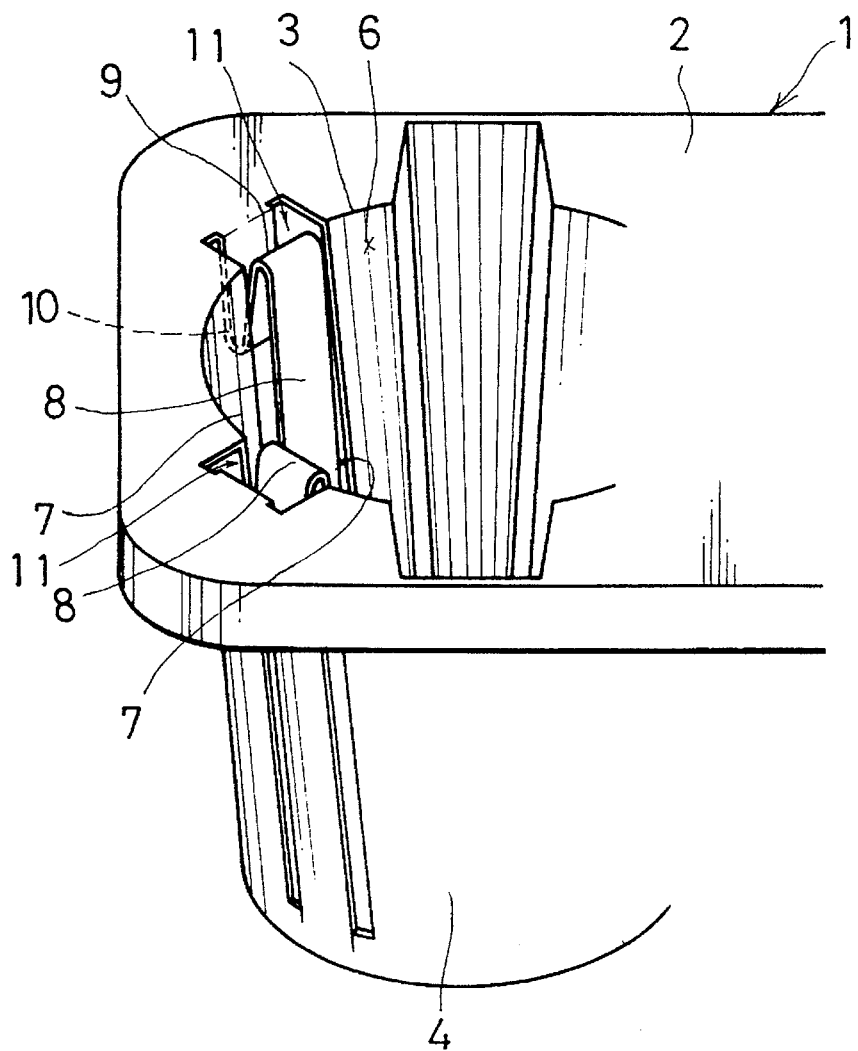
FIG. 4 is a perspective view of the essential parts of the tray.

As shown in FIGS. 3 and 4, the upper portion of each of the retainer members 8 has a first bent part 9 and a second bent part 10 which is connected to the base plate 2. The first bent part 9 has a configuration turned upwardly, while the second bent part 10 has a configuration turned downwardly, so that the first-and second bent parts 9 and 10 can impart resiliency to the retainer member 8 in a direction substantially toward the center of the container section 6. As shown in FIG. 4, upper parts of each pair of the slits 7 are connected to a substantially rectangular cut-out portion 11 formed on the peripheral edge of the opening 3. The cut-out portion 11 has an inner end connected to the opening 3 and has an outer end from which the second bent part 10 of the retainer member 8 extends.

In this embodiment, the retainer member 8 is inclined relative to the peripheral wall 4 in a direction radially inwardly of the peripheral wall 4 such that the retainer member 8 protrudes inwardly of the peripheral wall 4 to some extent. Thus, the inner space defined by the retainer members 8 is smaller than the space defined by the peripheral wall 4.

The operation of the above embodiment will now be explained in the case where the pots each having a substantially truncated conical configuration or the same configuration as the peripheral wall 4 of the container section 6 are put in the tray 1.

When each pot to be carried by the tray 1 has a size smaller than the space defined by the peripheral wall 4 but greater than the space defined by the retainer members 8, the retainer members 8 resiliently deform outwardly through abutment on the side wall of the pot as the pot is inserted into the space defined by the peripheral wall 4. The pot can therefore be stably held in position within the container section 6 by the resiliently pressing force of the retainer members 8.

When each pot to be carried has the size substantially the same as the space defined by the peripheral wall 4, the retainer members 8 resiliently deform outwardly as the pot is inserted into the container section 6 as described above. In this case, when the pot has been completely inserted into the container section 6, the retainer members 8 are brought in substantially the same plane as the peripheral wall 4 by virtue of the cut-out portions 11 around the opening 3. Therefore, the pot can also be stably held in position without problem within the container section 6 by the pressing force of the retainer members 8 on the side wall of the pot.

As described above, the tray 1 of this embodiment is effective to stably hold the pots in position within the container sections 6 even if the size of the pots has been changed. This means that the pots having a configuration different from the truncated conical configuration can be also stably held in position within the container sections 6. Thus, with this embodiment, the tray 1 can be conveniently used for transporting the pots.

In the above embodiment, the tray 1 includes two container sections 6, and each container section 6 has four retainer members 8. Such number of the container sections 6 and the retainer members 8 can be selectively determined. Further, the container sections 6 may have different configurations other than the truncated conical configuration.

While the invention has been described with reference to a preferred embodiment thereof, it is to be understood that modifications or variation may be easily made without departing from the spirit of this invention which is defined by the appended claims.

What is claimed is:

1. A tray for carrying a plurality of plant pots, comprising:
   a base plate;
   a plurality of container sections provided in said base plate and formed integrally therewith for receiving pots therein, each of said container sections having an open top end, a peripheral wall and a bottom wall; and
   retainer means, including a plurality of retainer members disposed on said peripheral wall of each of said container sections and spaced from each other in a direction circumferentially of said peripheral wall, each of said retainer members including an upper portion connected to said base plate and a lower portion connected to said peripheral wall at a position adjacent said bottom wall, each retainer member having both lateral sides separated from said peripheral wall by slits and said upper portion having at least one bent part which serves to provide resiliency to the corresponding retainer member, said retainer means being operable to resiliently apply a pressing force to the side wall of a pot received within said container section so as to fixedly hold the pot in position, whereby each of said retainer members resiliently deform in a direction away from the center of the corresponding container section through abutment on the side wall of the pot when the pot is inserted into said container section.

2. The tray as defined in claim 1 wherein said retainer members are formed integrally with said peripheral wall.

3. The tray as defined in claim 1, wherein said at least one bent part includes a first bent part having a configuration turned upwardly and a second bent part having a configuration turned downwardly and connected to said base plate.

\* \* \* \* \*